(12) United States Patent
Souques et al.

(10) Patent No.: US 11,156,492 B2
(45) Date of Patent: Oct. 26, 2021

(54) CAPACITOR FUEL PROBE

(71) Applicant: Safran Aerotechnics, Plaisir (FR)

(72) Inventors: Stéphane Souques, Abondant (FR); Thomas Lavazais, Villepreux (FR)

(73) Assignee: SAFRAN AEROTECHNICS, Plaisir (FR)

( * ) Notice: Subject to any disclaimer, the term of this patent is extended or adjusted under 35 U.S.C. 154(b) by 129 days.

(21) Appl. No.: 16/487,348

(22) PCT Filed: Feb. 15, 2018

(86) PCT No.: PCT/EP2018/053838
§ 371 (c)(1),
(2) Date: Aug. 20, 2019

(87) PCT Pub. No.: WO2018/153775
PCT Pub. Date: Aug. 30, 2018

(65) Prior Publication Data
US 2020/0064176 A1 Feb. 27, 2020

(30) Foreign Application Priority Data
Feb. 22, 2017 (EP) ..................................... 17305193

(51) Int. Cl.
*G01F 23/26* (2006.01)
*G01F 25/00* (2006.01)

(52) U.S. Cl.
CPC .......... *G01F 23/265* (2013.01); *G01F 23/266* (2013.01); *G01F 25/0061* (2013.01)

(58) Field of Classification Search
CPC .... G01F 23/266; G01F 23/265; G01F 23/263; G01F 23/242; G01F 23/26; G01F 23/00; G01F 23/0061
See application file for complete search history.

(56) References Cited

U.S. PATENT DOCUMENTS 2,752,543 A * 6/1956 Smith .................. G01F 23/268
361/284
2,868,015 A * 1/1959 Haropulos ............ G01F 23/263
73/304 R
(Continued)

FOREIGN PATENT DOCUMENTS

EP 2869044 5/2015
JP 2010210269 9/2010
(Continued)

OTHER PUBLICATIONS

International Patent Application No. PCT/EP2018/053838, Search Report and Written Opinion, dated May 7, 2018.

*Primary Examiner* — David A. Rogers
(74) *Attorney, Agent, or Firm* — Kilpatrick Townsend & Stockton LLP

(57) ABSTRACT

A capacitor fuel probe comprises a plurality of capacitor segments which are superposed on one another along a probe axis. The capacitor segments are distributed into three sets and connected electrically in parallel within each set separately. A capacity measurement which is performed for all the sets allows determining a fuel level while taking into account a possible variation of a dielectric constant of the fuel parallel to the probe axis. Top height values $h_n$ of the capacitor segments are selected so that $h_{n-1} < h_n \cdot (K_{min}-1)/(K_{max}-1)$, for any integer n-value from 2 to N, N being the number of capacitor segments, n varying according a superposition order of the capacitor segments, and $K_{min}$ and $K_{max}$ being minimum and maximum values for a fuel dielectric constant which are prescribed for the capacitor fuel probe.

11 Claims, 3 Drawing Sheets

(56) References Cited

U.S. PATENT DOCUMENTS

| | | | | |
|---|---|---|---|---|
| 3,010,320 A | * | 11/1961 | Sollecito | G05D 9/12 73/304 C |
| 3,283,577 A | | 11/1966 | Schuck | |
| 3,827,300 A | * | 8/1974 | Thaler | G01F 23/263 73/304 C |
| 4,003,259 A | | 1/1977 | Hope | |
| 4,099,167 A | * | 7/1978 | Pomerantz | G01F 23/265 340/620 |
| 4,165,641 A | * | 8/1979 | Pomerantz | G01F 23/26 73/290 R |
| 4,235,106 A | * | 11/1980 | Maltby | G01F 23/24 73/304 C |
| 4,295,370 A | * | 10/1981 | Bristol | G01F 23/268 361/284 |
| 4,418,570 A | * | 12/1983 | Warren, Jr. | G01B 7/10 336/144 |
| 4,526,027 A | * | 7/1985 | Franklin | G01F 25/0061 73/1.73 |
| 4,987,776 A | * | 1/1991 | Koon | G01F 23/265 340/612 |
| 5,050,431 A | * | 9/1991 | McDonald | G01F 23/266 73/340 C |
| 5,078,010 A | * | 1/1992 | Lock | G01F 23/26 222/64 |
| 5,103,368 A | * | 4/1992 | Hart | G01F 23/268 361/284 |
| 5,156,047 A | * | 10/1992 | Tuma | G01F 23/24 340/620 |
| RE34,731 E | * | 9/1994 | Lee | G01F 23/265 324/665 |
| 5,406,843 A | * | 4/1995 | Hannan | G01F 23/265 702/52 |
| 5,423,214 A | * | 6/1995 | Lee | G01C 9/06 73/340 C |
| 5,477,727 A | * | 12/1995 | Koga | G01F 23/263 361/284 |
| 5,613,399 A | * | 3/1997 | Hannan | G01F 23/265 702/55 |
| 6,101,873 A | * | 8/2000 | Kawakatsu | G01F 23/268 73/304 C |
| 6,138,508 A | * | 10/2000 | Hannan | G01F 23/265 324/665 |
| 6,164,132 A | * | 12/2000 | Matulek | G01F 23/265 73/304 C |
| 6,293,145 B1 | * | 9/2001 | Wallrafen | G01F 23/266 340/450 |
| 6,490,920 B1 | * | 12/2002 | Netzer | G01C 9/06 324/687 |
| 6,502,460 B1 | * | 1/2003 | Lin | F01M 11/12 73/304 C |
| 6,539,797 B2 | * | 4/2003 | Livingston | G01F 23/266 73/290 R |
| 6,563,328 B1 | * | 5/2003 | Lenormand | G01F 23/268 324/663 |
| 6,761,067 B1 | * | 7/2004 | Capano | G01F 23/265 340/620 |
| 6,862,932 B2 | * | 3/2005 | Zimmermann | G01F 23/246 73/290 R |
| 7,161,361 B2 | * | 1/2007 | Qu | G01F 23/265 324/686 |
| 7,318,344 B2 | * | 1/2008 | Heger | G01F 23/265 340/612 |
| 7,370,528 B2 | * | 5/2008 | Scardovi | G01F 23/261 73/304 C |
| 7,963,164 B2 | | 6/2011 | Ross et al. | |
| 7,992,437 B2 | * | 8/2011 | Tshishiku | G01F 23/241 73/431 |
| 8,181,516 B2 | * | 5/2012 | Naydenov | G01F 23/268 73/304 C |
| 8,776,595 B2 | * | 7/2014 | Milone | G01F 23/24 73/304 C |
| 8,931,340 B2 | * | 1/2015 | Wiederkind-Klein | G01F 23/268 73/304 C |
| 9,354,099 B2 | * | 5/2016 | Tichborne | G01F 23/266 |
| 9,488,513 B2 | * | 11/2016 | Kumar | G01F 23/00 |
| 9,733,116 B2 | * | 8/2017 | Hoppe | G01F 23/268 |
| 9,921,095 B2 | * | 3/2018 | Tichborne | G01F 23/266 |
| 10,151,616 B1 | * | 12/2018 | Otagaki | G01F 23/266 |
| 10,371,555 B2 | * | 8/2019 | Philipson | G01F 23/266 |
| 2001/0000851 A1 | * | 5/2001 | Morimoto | G01F 23/266 73/304 C |
| 2002/0008526 A1 | * | 1/2002 | Martin | G01F 23/26 324/678 |
| 2002/0129650 A1 | * | 9/2002 | Zimmermann | G01F 23/246 73/295 |
| 2003/0000303 A1 | * | 1/2003 | Livingston | G01F 23/266 73/304 C |
| 2003/0042917 A1 | * | 3/2003 | Davis | G01F 23/266 324/662 |
| 2006/0196263 A1 | * | 9/2006 | Stahlmann | G01F 23/268 73/304 R |
| 2007/0240506 A1 | * | 10/2007 | Lin | G01F 23/266 73/304 R |
| 2018/0023993 A1 | * | 1/2018 | Philipson | G01F 23/268 73/304 C |
| 2018/0188098 A1 | * | 7/2018 | Souques | G01F 23/0076 |
| 2020/0072651 A1 | * | 3/2020 | Tadas | G01F 23/266 |

FOREIGN PATENT DOCUMENTS

| | | | | |
|---|---|---|---|---|
| WO | | 2005111551 | 11/2005 | |
| WO | WO-2016034800 A1 | * | 3/2016 | G01F 23/263 |

* cited by examiner

| Segment number n | Top height value $h_n$ (mm) | | Capacitance set | Compensator set |
| --- | --- | --- | --- | --- |
| | 1st example | 2nd example | | |
| 1 | 38 | 40 | A | - |
| 2 | 81 | 80 | B | A |
| 3 | 129 | 120 | C | B |
| 4 | 183 | 174 | A | C |
| 5 | 243 | 228 | B | A |
| 6 | 310 | 282 | C | B |
| 7 | 385 | 375 | A | C |
| 8 | 468 | 468 | B | A |
| 9 | 561 | 561 | C | B |

CAPACITOR FUEL PROBE

FIELD OF THE INVENTION

The invention relates to a capacitor fuel probe, in particular for aircraft, and a process for manufacturing such capacitor fuel probe.

BACKGROUND OF THE INVENTION

Aircraft fuel probes are usually comprised of two concentric electrically conductive tubes which form a capacitor. The capacitor value then varies as a function of the fuel height existing between the tubes, so that measuring the capacitor value allows inferring a value for the fuel level. The equation for calculating the fuel level H is $H=(C-C_e)/(\alpha \cdot (K-1))$, where C is the capacitor value measured, $C_e$ is the capacitor value corresponding to no fuel present between the capacitor tubes, the index e denoting that the capacitor is empty, i.e. without fuel, $\alpha$ is a specific constant depending only on the geometry and manufacturing features of the probe, and K is the dielectric constant of the fuel. The dielectric constant K of the fuel is defined as $K=\varepsilon/\varepsilon_0$, where $\varepsilon$ and $\varepsilon_0$ are the dielectric permittivity values of the fuel and of vacuum, respectively.

However, such capacitor fuel probe has the following drawbacks when implemented in an aircraft fuel tank:

the fuel within the tank may experience significant temperature gradients, which causes the local value of the fuel dielectric constant to vary across the tank, in particular along the capacitor fuel probe. This results in an error for the fuel level H which is calculated from the measured capacitor value, and such error may be significant; and fuel used for filling-up one aircraft fuel tank at an airport may be different in fuel type from that of a fuel quantity which remained within the tank before refuelling. In particular, filling-up fuel and remaining fuel may have different density values and different dielectric constant values. Because of specific gravity, filling-up fuel and remaining fuel do not mix but lie on one another, so that the value of the fuel dielectric constant varies across the length of the capacitor fuel probe after the filling-up has been completed. This also results in an error for the fuel level which is calculated. This latter error becomes even more significant if fuels from special sources are used, such as hydro-processed esters and fatty acids or fuel obtained from coal using Fischer-Tropsch catalyst, instead of fuel obtained from refinery of crude oil.

Consequences of such errors in the fuel level calculated may be changes in the fuel quantity information which is displayed on cockpit instruments and which may confuse the pilot. Other consequences may be false alarm triggered by fuel quantity monitoring functions, fuel spillage upon refuelling, erroneous fuel transfer between separate tanks on-board the aircraft, etc.

Generally, the errors in the fuel level calculated limit the accuracy that can be guaranteed for a given application. Typically, ARINC 611-1 standard requires maximum inaccuracy of 1% of full scale. State-of-the-Art shows that is difficult to meet this requirement with currently existing systems, and that significant hardware complexity is then required.

For improving the fuel level determination from capacitor fuel probes, it has been proposed to use probes which are submerged in the fuel for determining the actual value of the fuel dielectric constant, and then combining the value thus obtained for the fuel dielectric constant with a capacitor value measured from a capacitor fuel probe which is partially submerged. But this is still not satisfactory although improving the accuracy of the fuel level determination, because the capacitor used for determining the fuel dielectric constant value and that which is used for the fuel level calculation relate to locations that are apart from each other. And horizontal temperature gradients may exist within the aircraft fuel tank, in particular due to solar radiation impinging on the aircraft wing in which the fuel tank is situated. Also such implementations require complex algorithms to determine whether each fuel probe which is used for obtaining the fuel dielectric constant is immersed or not, and suffer from limited reliability.

According to another attempt for improving the accuracy of the fuel level determination based on capacitor probes, it has been proposed to dedicate a small capacitor segment which is located at the bottom of the probe, and which has a known length, for determining the value of the fuel dielectric constant. But this is not efficient for taking into account a vertical gradient possibly existing and causing a variation in the value of the fuel dielectric constant along the capacitor fuel probe.

Then, U.S. Pat. No. 3,283,577 proposes a segmented capacitor fuel probe which is adapted for allowing determination of the fuel dielectric constant value at varying heights along the probe. To this end, measuring units are provided separately from the capacitor segments. This allows taking into account dielectric constant values which are more accurate when calculating the fuel level. But such system is complex, including numerous components which participate to increasing the overall weight and cost.

Starting from this situation, one object of the present invention consists in providing a new capacitor fuel probe which allows more accurate fuel level determination. In particular, the invention aims at taking into account variations in the value of the fuel dielectric constant which may exist along the probe, when determining the fuel level.

An additional object is to limit the number of the components that are necessary to be added, compared to the existing systems.

OBJECTS AND SUMMARY OF THE DISCLOSURE

For meeting these objects or others, a first aspect of the present invention proposes a capacitor fuel probe which is intended for measuring a fuel level along a probe axis when a dielectric constant value of the fuel is comprised between a minimum limit $K_{min}$ and a maximum limit $K_{max}$, these minimum and maximum limits being prescribed for the capacitor fuel probe.

The capacitor fuel probe comprises a series of N separated capacitor segments which are superposed on one another along the probe axis, N being an integer higher than 5. Each capacitor segment extends from a bottom height value to a top height value along the probe axis, and the top height value of any one of the capacitor segments corresponds to the bottom height value of the next capacitor segment when moving from the lowest one of the capacitor segments to the highest one.

Within the context of the invention, the phrase "capacitor segments" denotes parts of a capacitor which can be connected in parallel with one another according to various schemes through appropriate electrical connections. As well known by the Man skilled in capacitor technology, each capacitor segment may be equivalently comprised of either two capacitor electrodes which are dedicated to this capacitor segment separately from the other capacitor segments, or comprised of one capacitor electrode which is dedicated to this capacitor segment and arranged with respect to a common electrode which is shared between all the capacitor segments. In this latter case, each capacitor segment may be considered as comprising its dedicated capacitor electrode and part of the common electrode which faces this capacitor electrode. Both embodiment types are encompassed in this description through the phrase "capacitor segment".

According to a first feature of the invention, the capacitor fuel probe is further designed so that any three successive ones of the capacitor segments are electrically isolated from each other. Then, each capacitor segment is assigned to one out of at least three sets by repeating one and same ordered sequence of the sets while moving from the lowest one of the capacitor segments to the highest one according to a superposition order along the probe axis. All the capacitor segments within each set are connected electrically according to a parallel connection arrangement separately from the other sets.

A second feature of the invention applies when numbering progressively all the capacitor segments with an integer index n from the lowest capacitor segment to the highest one along the probe axis, and $h_n$ denoting the top height value of the $n^{th}$ capacitor segment. The following condition is met:

$$h_{n-1} < h_n \cdot (K_{min}-1)/(K_{max}-1),$$

for any n-value from 2 to N.

In this way, measuring a first capacitor value which corresponds to all the capacitor segments connected in parallel can indicate that at least one of the sets, called compensator set, has no capacitor segment which is crossed by the fuel level whatever the value of the fuel dielectric constant between the minimum limit $K_{min}$ and the maximum limit $K_{max}$. Thus, a second capacitor value which is measured for the compensator set allows calculating an estimation of the fuel dielectric constant. Then, this estimation of the fuel dielectric constant in combination with the first capacitor value allows calculating a refined value for the fuel level.

In this way, the compensator set has the function of compensating in the level calculation variations possibly existing in the fuel dielectric constant along the probe axis. Such compensation can be accurate including for high fuel levels, since the probe part which is used for compensation is not limited to the lowest capacitor segment of the probe.

Such capacitor fuel probe may be adapted for operation within a fuel tank of an aircraft.

In preferred embodiments of the invention, at least one of the following additional features may be implemented advantageously, independently from each other or in combination of several of them:
  the number N of capacitor segments may be higher than 8, preferably equal to 9 and/or less than 16;
  the number of the sets in which the capacitor segments are connected in parallel within each set separately from the other sets, may be 3;
  the minimum limit $K_{min}$ for the fuel dielectric constant may be comprised between 1.90 and 2.06;
  the maximum limit $K_{max}$ for the fuel dielectric constant may be comprised between 2.19 and 2.35;
  respective length values of all the capacitor segments may increase with the n-values progressively along the capacitor fuel probe; and
  the top height values of the capacitor segments may equal $h_1 \cdot r^{(n-1)}$, where $h_1$ is the top height value of the lowest capacitor segment corresponding to n=1, and r is a geometric progression rate higher than $(K_{max}-1)/(K_{min}-1)$ and preferably less than 2.

In particular, the range from $K_{min}=1.98$ to $K_{max}=2.27$ contains all possible values for the fuel dielectric constant K when the fuel temperature is between −55° C. and +70° C. and the fuel is of one among the primary JET types, including JETA/A1 , JP4, JPS, JP7, JP8 and TS1.

Generally for the invention, the capacitor fuel probe may further comprise at least one capacitor measurement unit and a connection arrangement suitable for connecting electrically the capacitor measurement unit to any one of the sets of capacitor segments. In this way, the capacitor measurement unit can provide a measured capacitor value for any one of the capacitor segment sets.

A second aspect of the invention provides a process for manufacturing a capacitor fuel probe which is dedicated to measuring a fuel level along an axis of the probe, which process comprises the following steps:

/1/ assuming that a dielectric constant value of the fuel is comprised between a minimum limit $K_{min}$ and a maximum limit $K_{max}$, which are prescribed to the capacitor fuel probe;

/2/ determining respective top height values for a series of N capacitor segments, N being an integer higher than 5;

/3/ producing the capacitor fuel probe so that the N capacitor segments are superposed on one another along the probe axis;

/4/ distributing the N capacitor segments among at least three sets by repeating one and same ordered sequence of the sets while moving from a lowest one of the capacitor segments to a highest one along the probe axis, and connecting electrically all the capacitor segments within each set according to a parallel connection arrangement separately from the other sets; and /5/ optionally, fixing the capacitor fuel probe within an aircraft fuel tank.

Steps /2/ to /4/ are performed so that the capacitor fuel probe which is thus designed and manufactured complies with the first invention aspect, possibly including the optional features of the preferred embodiments, with the minimum limit $K_{min}$ and maximum limit $K_{max}$ for the fuel dielectric constant value as prescribed in step /1/.

Possibly, the design of the capacitor fuel probe may take into account uncertainties other than that related to the knowledge of the fuel dielectric constant range. In particular, the top height values of the capacitor segments may be determined in step /2/ such that the first capacitor value indicating that the fuel level crosses the $n^{th}$ capacitor segment for at least one value of the fuel dielectric constant comprised between the minimum limit $K_{min}$ and the maximum limit $K_{max}$, ensures that the $(n-2)^{th}$ capacitor segment is completely submerged in the fuel whatever the dielectric constant value between the minimum limit $K_{min}$ and the maximum limit $K_{max}$, for n from 3 to N, and also whatever error values selected from manufacturing errors related to the lengths of the capacitor segments, positioning errors relating to an assembly step of the capacitor fuel probe, and measurement errors related to capacitor values as measured with respect to actual capacitor values, each one of these error values being comprised between respective additional minimum and maximum limits which are prescribed for the capacitor fuel probe.

Finally, a third aspect of the invention proposes a fuel tank equipment for aircraft, which comprises a fuel tank and at least one capacitor fuel probe which is in accordance with the first invention aspect, and fixed within the fuel tank.

These and other features of the invention will be now described with reference to the appended figures, which relate to preferred but not-limiting embodiments of the invention.

BRIEF DESCRIPTION OF THE DRAWINGS

For clarity sake, element sizes which appear in FIGS. 1 and 2 do not correspond to actual dimensions or dimension ratios. Also, same reference numbers or signs which are indicated in different ones of these figures denote identical elements of elements with identical function.

MORE DETAILED DESCRIPTION

Figure 1:
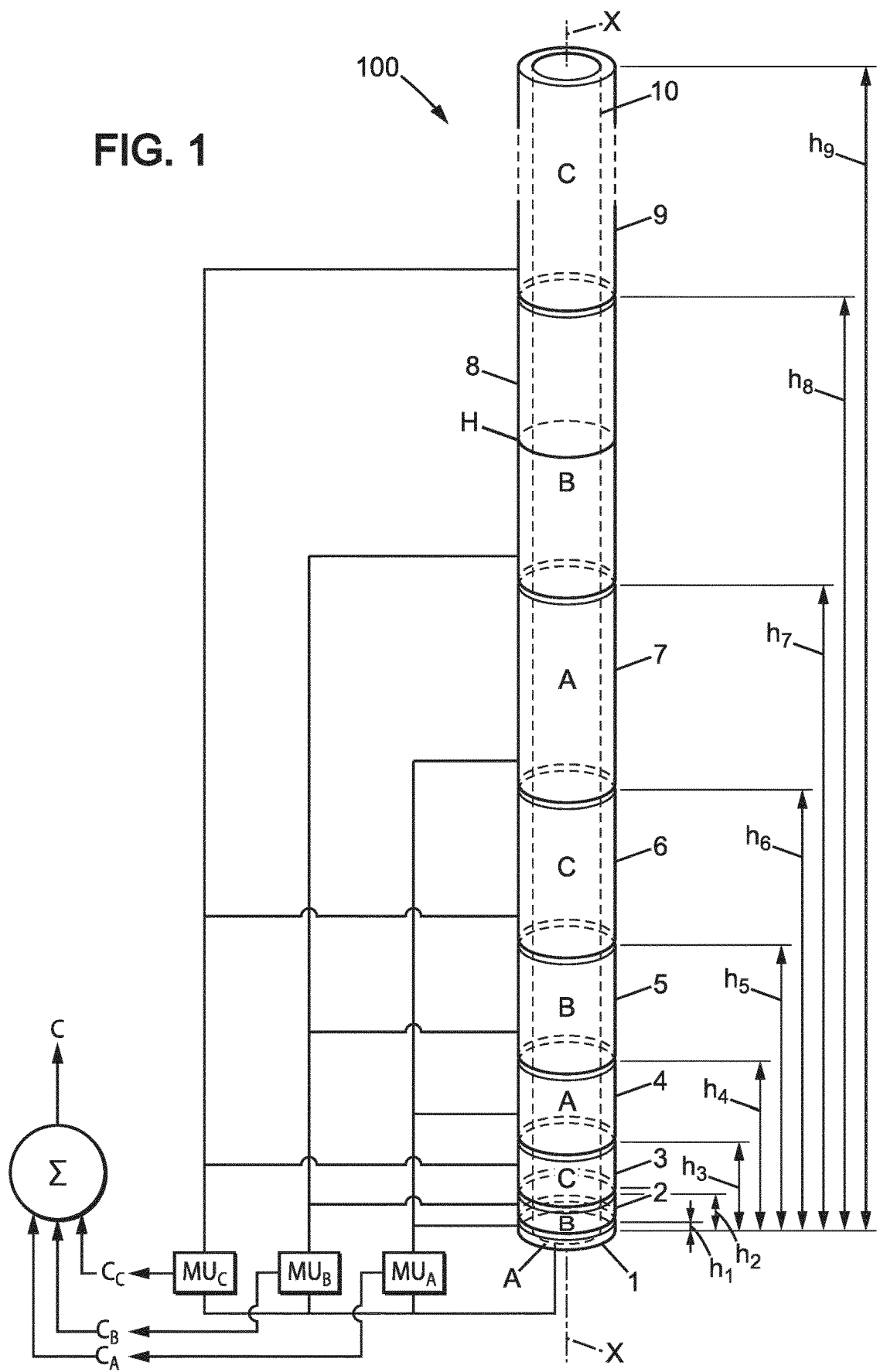
FIG. 1 is a perspective view of a capacitor fuel probe according to invention.

According to FIG. 1, a capacitor fuel probe 100 in accordance with the invention comprises 9 capacitor segments, as an example. Referring to the notations used in the general part of the invention description: N=9. The capacitor segments are stacked along the probe axis X-X, and are labelled with reference numbers from 1 to 9, starting from the lowest one at one end of the probe 100 considered as being the lowest end. These reference numbers for the capacitor segments correspond to the index n involved in the general part of this description. All the capacitor segments 1-9 may be cylindrical around the probe axis X-X, with one and same base area perpendicular to the axis X-X. Any two neighbouring ones of the capacitor segments 1-9 are preferably close to each other as much as possible, while being isolated electrically from each other. The top height value of the capacitor segment n measured parallel to the axis X-X, from the lower edge of the capacitor segment 1, is noted $h_n$, n varying from 1 to N. It is assumed that the bottom height value of the $(n+1)^{th}$ capacitor segment almost equals the top height value $h_n$.

The cylinder with reference number 10 is an inner continuous electrode common to all the capacitor segments 1-9. Each one of the capacitor segments 1-9, having index value n, form a respective capacitor together with the common electrode 10, thereby producing a capacitor value $C_n$ which depends on the fuel filling partially or totally the gap between this capacitor segment n and the common electrode 10. In alternative configurations possible for the probe 100, the continuous common electrode 10 may be arranged externally around the series of the capacitor segments 1-9.

The capacitor segments 1, 4 and 7 form a first set labelled A. They are connected electrically in parallel, and a first capacitor measurement unit $MU_A$ is dedicated for measuring the capacitor value $C_A$ of the set A. This capacitor value is $C_A = C_1 + C_4 + C_7$.

The capacitor segments 2, 5 and 8 form a second set labelled B. They are also connected electrically in parallel, and a second capacitor measurement unit $MU_B$ is dedicated for measuring the capacitor value $C_B$ of the set B: $C_B = C_2 + C_5 + C_8$.

The capacitor segments 3, 6 and 9 form a third set labelled C. They are also connected electrically in parallel, and a third capacitor measurement unit $MU_C$ is dedicated for measuring the capacitor value $C_C$ of the set C: $C_C = C_3 + C_6 + C_9$.

The capital letter which is indicated in FIG. 1 on each capacitor segment 1-9 refers to the set which contains this capacitor segment.

Embodiments for each capacitor measurement unit are well-known in the art and widely spread, so that it is useless to describe it here. Possibly, the three separated measurement units $MU_A$, $MU_B$ and $MU_C$ may be replaced by a single one. It is then combined with a variable electrical connection arrangement which can be controlled for connecting alternatively the single capacitor measurement unit to each one of the sets A, B and C, so as to measure successively the capacitor values $C_A$, $C_B$ and $C_C$.

The total capacitor value for the whole capacitor fuel probe 100 is $C = C_A + C_B + C_C$. It corresponds to all the capacitor segments 1-9 being connected virtually in parallel. In the absence of fuel, i.e. air being only present between each of the capacitor segments 1-9 and the common electrode 10, $C_A = C_{eA}$, $C_B = C_{eB}$, $C_C = C_{eC}$ and $C = C_e = C_{eA} + C_{eB} + C_{eC}$. Index e in these notations denotes the corresponding capacitor segment being empty, i.e. without fuel.

H denotes the height of a fuel level existing between the top edge of the capacitor segment 9 and the bottom edge of the capacitor segment 1. H is thus measured along the probe axis X-X, from the bottom edge of the lower capacitor segment, this latter corresponding to n=1. Therefore, H=0 relates to the fuel level being located at the bottom edge of the capacitor segment 1, and $H = h_9$ relates to the fuel level being located at the top edge of the capacitor segment 9.

Measuring the capacitor value C, called first capacitor value in the general part of this description, leads to the following gross estimate for the fuel level: $H = (C - C_e)/(\alpha \cdot (K-1))$, where $\alpha$ has been already defined and K is an approximate value for the fuel dielectric constant, which may be any value comprised between a predetermined minimum limit $K_{min}$ and a predetermined maximum limit $K_{max}$. This H-value is located within one of the capacitor segments 1-9, namely it is comprised between the top height values of two successive ones of the capacitor segments. In the example represented in FIG. 1, the fuel level H is located in the capacitor segment 8, corresponding to H being comprised between $h_7$ and $h_8$.

The fuel probe design principle of the invention consists in ensuring that the capacitor segment n−2 is completely submerged when the fuel level H is located in the capacitor segment n, for n higher than 3. For the example represented in FIG. 1, the capacitor segment 6 must be fully submerged.

For one and same first capacitor value C which is obtained as a measurement result, the maximum fuel level $H_{max}$ corresponds to the fuel dielectric constant assumed to be $K_{min}$, and the minimum fuel level $H_{min}$ corresponds to the fuel dielectric constant assumed to be $K_{max}$. This is expressed as: $C = C_e + \alpha \cdot (K_{min} - 1) \cdot H_{max} = C_e + \alpha \cdot (K_{max} - 1) \cdot H_{min}$.

Then, the invention sets that when $H_{max} = h_n$, then $H_{min} > h_{n-1}$, which expresses as $h_{n-1} < h_n \cdot (K_{min} - 1)/(K_{max} - 1)$.

The total length of the probe 100 is fixed at first. It corresponds to the top height value $h_9$. Then, the preceding inequality provides a maximum value for the top height value $h_8$ of the capacitor segment 8 from the $h_9$-value, and the same applies for obtaining a maximum value for the top height value $h_7$ of the capacitor segment 7 from the $h_8$-value, etc, down to a maximum value for the top height value $h_1$ of the capacitor segment 1 from the $h_2$-value.

In particular, the top height values $h_1$-$h_9$ which are determined in this way may form a geometric progression with rate r and index n, such as $h_n = h_1 \cdot r^{(n-1)}$, the rate r being higher than the value of the ratio $(K_{max}-1)/(K_{min}-1)$. In such embodiments or geometrical progression type, the individual lengths $(h_n - h_{n-1})$ of the capacitor segments increase with the n-value.

For example, $K_{min}$ may be 2.03, and $K_{max}$ may be 2.23. This corresponds to fuel JET-A1 for temperature values in the range from −30° C. to 50° C. as reported in ARINC 611-1 standard. Then, the ratio $(K_{max}-1)/(K_{min}-1)$ equals 1.194. So the successive $h_n$-values have to meet the condition $h_n/h_{n-1} > 1.194$. Table in FIG. 3 displays the $h_n$-values for two embodiment examples of the invention, both corresponding to these values for $K_{min}$ and $K_{max}$, N=9, a total length $h_9$ of the probe 100 equal to 561 mm (millimeter). α may equal 0.185 pF/mm (picofarad per millimeter), leading to C=106.9 pF (picofarad) when $K = K_{min}$.

After the respective top height values of all the capacitor segments have been determined as just explained, the probe 100 may be produced. For example, two hollow cylinders of electrically insulating material may be provided, and covered with electrically conducting paint on the external surface for the cylinder with smallest diameter, and on the internal surface for the cylinder with largest diameter. The cylinder with smallest diameter may be intended to form the common electrode 10, and the cylinder with largest diameter may be intended to form all the capacitor segments 1-9. Then the capacitor segments 1-9 may be delimited by inter-segment gaps which are devoid of electrically conducting paint. The gaps are located along the probe axis X-X so as to separate the capacitor segments while producing the desired capacitor segment top height values. Electrical connections to the capacitor segments 1-9 are then arranged according to the sets A, B and C as represented in FIG. 1.

Figures 2, 3:
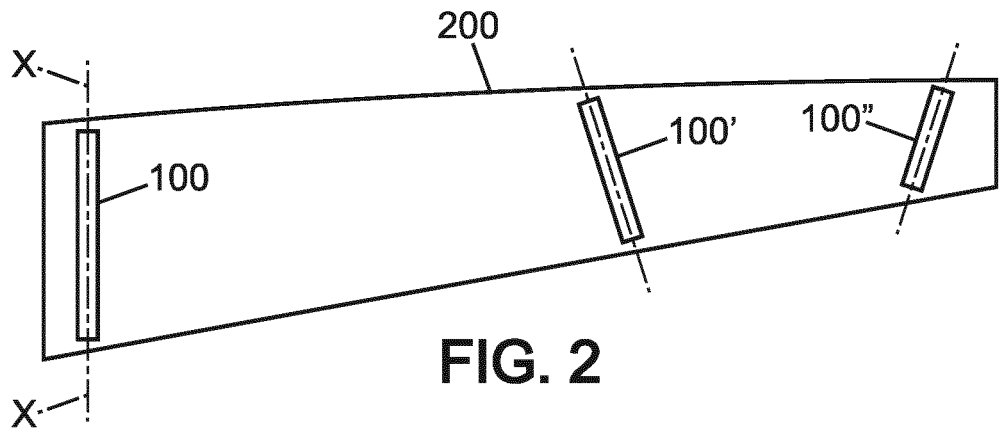
FIG. 2 illustrates an aircraft fuel tank in accordance with the invention.
FIG. 3 is a table displaying possible values for two capacitor fuel probes in accordance with FIG. 1.

The capacitor fuel probe 100 thus obtained is to be installed rigidly within a fuel tank such as an aircraft fuel tank 200 as represented in FIG. 2. Embodiments of rigid supports for maintaining the probe 100 at fixed location and orientation in the tank 200 are known in the art, so that it is not necessary to described them again here. Possibly, several probes according to the invention may be fixed within the tank 200, at respective locations apart from each other and with respective orientations which may vary from one probe to another one. Reference signs 100' and 100" denote such additional fuel probes which may have orientations and lengths different from those of the probe 100.

The way of using such probe 100 for obtaining an improved determination of the fuel level H is now described.

In a first step, the capacitor values $C_A$, $C_B$ and $C_C$ are measured simultaneously or almost simultaneously using the measurement units $MU_A$, $MU_B$ and $MU_C$ while the actual fuel level is situated between the bottom and top of the probe 100. Then the value of the total capacitor is computed, using the formula: $C = C_A + C_B + C$.

In a second step, a minimum height value possible for the fuel level H to be determined is calculated from the total capacitor value C, using the other following formula: $H_{min} = (C-C_e)/(\alpha \cdot (K_{max}-1))$. This value $H_{min}$ may be situated either within the same capacitor segment as the actual fuel level H, or may be situated in the neighboring capacitor segment just below that of the actual fuel level H.

In a third step, that one of the capacitor segments which overlaps the minimum height value $H_{min}$ as calculated in the second step is identified, and called first selected capacitor segment. The capacitor segment which is situated just below the first selected capacitor segment is then identified in turn, and called second selected capacitor segment. Supposing that the actual fuel level H is situated within the $n^{th}$ capacitor segment, then the first selected capacitor segment is either the same $n^{th}$ capacitor segment, leading to the second selected capacitor segment being the $(n-1)^{th}$ capacitor segment, or the first selected capacitor segment is the $(n-1)^{th}$ capacitor segment, leading to the second selected capacitor segment being the $(n-2)^{th}$ capacitor segment. In the table of FIG. 3, the fourth column entitled "Capacitance set" indicates that one of the sets A-C which contains the first selected capacitor segment, when this latter is that indicated in the first column at the same table row. Then, the fifth column entitled "Compensator set" indicates the set which contains the second selected capacitor segment.

For example, when the actual fuel level H is within the eighth capacitor segment (n=8) as represented in FIG. 1, the measured value C for the total capacitor may lead to $H_{min}=370$ mm. For both capacitor fuel probes of FIG. 3, this $H_{min}$-value is situated in the seventh capacitor segment (n=7). Then, the first selected capacitor segment is the seventh one, corresponding to the capacitance set being A, and the second selected capacitor segment is the sixth one, corresponding to the compensator set being C.

In a fourth step, the measured capacitor value for the compensator set is used for calculating a value for the dielectric constant K of the fuel, which is effective as a mean value between the bottom of the probe 100 and the fuel level H. This calculated value for the dielectric constant K is noted $K_{fine}$. It can be calculated accurately since the invention probe design ensures that the second selected capacitor segment is entirely submerged in the fuel, and also any other capacitor segment belonging to the compensator set which is situated below the second selected capacitor segment, if such exists, whereas any capacitor segment which also belongs to the compensator set but is situated above the second selected capacitor segment, if such exists too, is completely out of the fuel. Therefore, the submerged length of the compensator set is known with certainty. This total length of the capacitor segments of the compensator set which are submerged in the fuel increases with the index value n of the first selected capacitor segment, which proves that a possibly existing vertical gradient for the fuel dielectric constant K is taken into account in an improved extent. Again for the example of $H_{min}=370$ mm, the third (n=3) and sixth (n=6) capacitor segments form the submerged part of the set C. Then, the dielectric constant value $K_{fine}$ can be calculated using the following formula:

$$K_{fine} = 1 + (C_C - C_{eC})/[\alpha \cdot (h_3 - h_2 + h_6 - h_5)]$$

From the above explanations, the Man skilled in the art will be able to infer the correct formula to be used for calculating the dielectric constant value $K_{fine}$, for each line of the table of FIG. 3.

Finally, in a fifth step, the fuel level can be determined using the formula:

$$H = (C - C_e)/(\alpha \cdot (K_{fine} - 1)),$$

where $C = C_A + C_B + C_C$ again, as computed in the first step.

Figure 4:
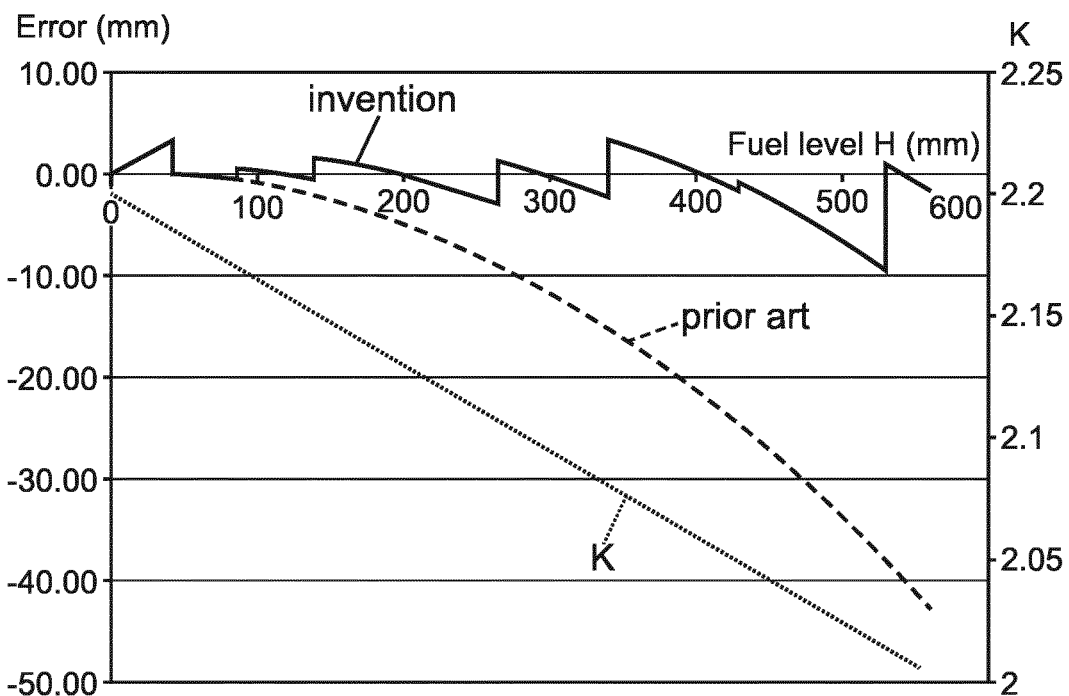
FIGS. 4 and 5 are diagrams displaying errors existing in the fuel level values which are calculated using one capacitor fuel probe according to FIG. 3, for two different fuel dielectric constant distributions.

The diagram of FIG. 4 displays the error existing between the fuel level determined in this way, for the first invention embodiment example displayed in FIG. 3, and the actual fuel level. The actual fuel level values are indicated by the horizontal axis, in millimeters, and the error values are indicated by the vertical axis on the left part of the diagram, also in millimeters. The error curve related to implementing the invention is drawn in continuous line, for the particular case of the fuel dielectric constant K decreasing linearly from 2.20 at the bottom of the probe 100 down to about 2.00 at the top of the probe 100. Such variation for the dielectric constant K corresponds to the dotted line referring again to the horizontal axis for the in-tank height but the vertical axis on the right part of the diagram for the K-values. The maximum error for the fuel level as determined by implementing the invention is about 10 mm in absolute value. For comparison, the diagram also displays the error obtained when using a probe as known from prior art, which is comprised of one 40 mm bottom capacitor segment which is dedicated to dielectric constant calculation, and one single continuous upper segment which is dedicated only to fuel level determination. With such prior art probe, the error increases with the fuel level up to 43 mm in absolute value when the fuel level is at the probe top.

Figure 5:
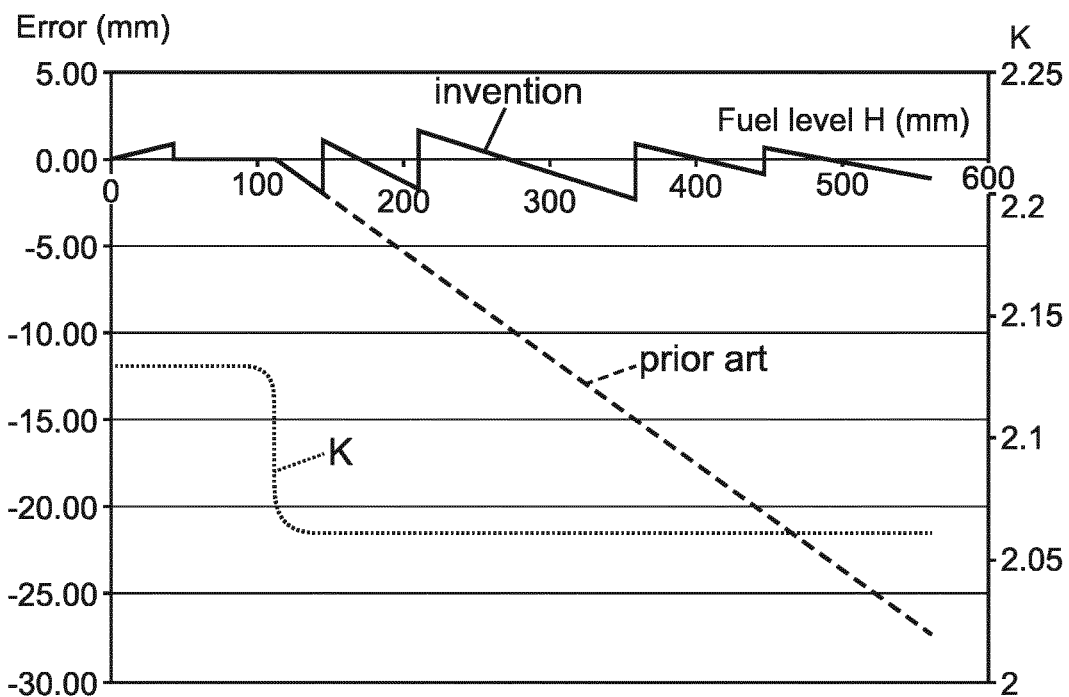

The diagram of FIG. 5 corresponds to that of FIG. 4 for a situation where the fuel dielectric constant K has a first value of about 2.13 below the height value of 110 mm, and a second value of about 2.06 above the height value of 110 mm. Such situation may occur after refueling when the fuel type which is used for refueling is lighter than that of the fuel which was remaining in the tank before refueling. The error when implementing again the probe of the first invention embodiment example from FIG. 3 is always less than 2.5 mm in absolute value, whereas it rises up to 27 mm in absolute value when using the same prior art probe as in FIG. 4.

Possibly, the capacitor fuel probe 100 may be further designed to take into account other possible errors, in addition to that resulting from the lack of knowledge about the exact value or value distribution of the fuel dielectric constant K. Such additional errors may be manufacturing errors which relate to the lengths of the capacitor segments 1-9, and/or positioning errors which relate to an assembly step of the capacitor fuel probe 100, and which could affect the α-constant, and/or measurement errors which relate to the measurement of the capacitor values. To this end, one needs that respective minimum and maximum limits are prescribed for each one of the errors which are to be taken into account. Then, the minimum possible fuel level $H_{min}$ and the maximum possible fuel level $H_{max}$ may be calculated for one and same value of the total capacitor C so as to encompass any fuel height shift possibly due to each error when this latter varies between the limits prescribed for this error, and any combination of these error values. The probe design can then be continued in a similar way as described earlier, by selecting $h_{n-1} < H_{min}$ when $H_{max} = h_n$, for n from 2 to 9. When determining a fuel level using a probe designed in this way, the minimum height $H_{min}$ for the fuel level H is to be calculated using the minimum or maximum limits for all the errors considered. From this value, the remaining of the fuel level determination method is unchanged.

One must understand that the invention is not limited to the detailed description provided above, and that secondary aspects of the embodiments described may be adapted. In particular, all numeral values that have been cited may be changed.

As described, the capacitor segments may be produced by using an external electrode tube which is segmented and an internal electrode tube which is continuous from the top probe edge to the bottom probe edge. But using an external electrode tube which is continuous from the top probe edge to the bottom probe edge and an internal electrode tube which is segmented is also possible. Both external and internal electrode tubes being segmented is also possible.

The invention claimed is:

1. A capacitor fuel probe for measuring a fuel level along a probe axis when a dielectric constant value of the fuel is comprised between a minimum limit $K_{min}$ and a maximum limit $K_{max}$, said minimum and maximum limits being prescribed for the capacitor fuel probe, the capacitor fuel probe comprising a series of N separated capacitor segments which are superposed on one another along the probe axis, N being an integer higher than 5, each capacitor segment extending from a bottom height value to a top height value along the probe axis, and the top height value of any one of the capacitor segments being arranged just below the bottom height value of the next capacitor segment when moving from the lowest one of the capacitor segments to the highest one of said capacitor segments, the capacitor fuel probe being further designed so that any three successive ones of the capacitor segments are electrically isolated from each other, and for any three successive capacitor segments group, each of the capacitor segments in that successive capacitor segments group is assigned to a different set from at least three sets, and where a pattern for assignment is repeated for each three successive capacitor segments group while moving from the lowest capacitor segment to the highest capacitor segment according to a superposition order along the probe axis, all the capacitor segments within each set being connected electrically according to a parallel connection arrangement separately from the other sets, wherein, when all the capacitor segments are numbered progressively with an integer index n from the lowest capacitor segment to the highest capacitor segment along the probe axis, and $h_n$ denoting the top height value of the $n^{th}$ capacitor segment, the following condition is met:

$h_{n-1} < h_n \cdot (K_{min} - 1)/(K_{max} - 1)$, for any n-value from 2 to N, so that measuring a first capacitor value corresponding to all the capacitor segments connected in parallel, indicates that at least one of the sets, called compensator set, has no capacitor segment crossed by the fuel level whatever the value of the fuel dielectric constant between the minimum limit $K_{min}$ and the maximum limit $K_{max}$, and so that a second capacitor value which is measured for said compensator set allows calculating an estimation of the fuel dielectric constant, and said estimation of the fuel dielectric constant in combination with the first capacitor value allows calculating a refined value for the fuel level.

2. The capacitor fuel probe according to claim 1, wherein N is higher than 8, more preferably equal to 9 or less than 16.

3. The capacitor fuel probe according to claim 1, wherein a number of the sets in which the capacitor segments are connected in parallel within each set separately from the other sets, is 3.

4. The capacitor fuel probe according to claim 1, wherein the minimum limit $K_{min}$ for the fuel dielectric constant is comprised between 1.90 and 2.06.

5. The capacitor fuel probe according to claim 1, wherein the maximum limit $K_{max}$ for the fuel dielectric constant is comprised between 2.19 and 2.35.

6. The capacitor fuel probe according to claim 1, wherein respective length values of all the capacitor segments are increasing with the n-values progressively along the capacitor fuel probe.

7. The capacitor fuel probe according to claim 1, wherein the top height values ($h_1$-$h_9$) of the capacitor segments equal $h_1 \cdot r^{(n-1)}$, where $h_1$ is the top height value of the lowest capacitor segment corresponding to n=1, and r is a geometric progression rate higher than $(K_{max}-1)/(K_{min}-1)$ and preferably less than 2.

8. The capacitor fuel probe according to claim 1, further comprising at least one capacitor measurement unit and a connection arrangement suitable for connecting electrically the capacitor measurement unit to any one of the sets of capacitor segments, so that said capacitor measurement unit provides a measured capacitor value for any one of said sets of capacitor segments.

9. The capacitor fuel probe according to claim 1, adapted for operation within a fuel tank of an aircraft.

10. A process for manufacturing a capacitor fuel probe which is dedicated to measuring a fuel level along an axis of the probe, comprising the following steps:
/1/ assuming that a dielectric constant value of the fuel is comprised between a minimum limit $K_{min}$ and a maximum limit $K_{max}$, which are prescribed to the capacitor fuel probe;
/2/ determining respective top height values for a series of N capacitor segments, N being an integer higher than 5;
/3/ producing the capacitor fuel probe so that the N capacitor segments are superposed on one another along the probe axis; and
/4/ distributing the N capacitor segments among at least three sets by repeating one and same ordered sequence of the sets while moving from a lowest one of the capacitor segments to a highest one of the capacitor segments along the probe axis, and connecting electrically all the capacitor segments within each set according to a parallel connection arrangement separately from the other sets,
wherein steps /2/ to /4/ are performed so that the capacitor fuel probe is configured for measuring a fuel level along a probe axis when a dielectric constant value of the fuel is comprised between a minimum limit $K_{min}$ and a maximum limit $K_{max}$, said minimum and maximum limits being prescribed for the capacitor fuel probe,
the capacitor fuel probe comprising a series of N separated capacitor segments which are superposed on one another along the probe axis, N being an integer higher than 5, each capacitor segment extending from a bottom height value to a top height value along the probe axis, and the top height value of any one of the capacitor segments corresponding to the bottom height value of the next capacitor segment when moving from the lowest one of the capacitor segments to the highest one of said capacitor segments,
the capacitor fuel probe being further designed so that any three successive ones of the capacitor segments are electrically isolated from each other, and each capacitor segment being assigned to one out of at least three sets by repeating one and same ordered sequence of the sets while moving from the lowest capacitor segment to the highest capacitor segment according to a superposition order along the probe axis, all the capacitor segments within each set being connected electrically according to a parallel connection arrangement separately from the other sets,
wherein, when all the capacitor segments are numbered progressively with an integer index n from the lowest capacitor segment to the highest capacitor segment along the probe axis, and $h_n$ denoting the top height value of the $n^{th}$ capacitor segment, the following condition is met:

$$h_{n-1} < h_n \cdot (K_{min}-1)/(K_{max}-1),$$

for any n-value from 2 to N,
so that measuring a first capacitor value corresponding to all the capacitor segments connected in parallel, indicates that at least one of the sets, called compensator set, has no capacitor segment crossed by the fuel level whatever the value of the fuel dielectric constant between the minimum limit $K_{min}$ and the maximum limit $K_{max}$,
and so that a second capacitor value which is measured for said compensator set allows calculating an estimation of the fuel dielectric constant,
and said estimation of the fuel dielectric constant in combination with the first capacitor value allows calculating a refined value for the fuel level, with the minimum limit $K_{min}$ and maximum limit $K_{max}$ for the fuel dielectric constant value as prescribed in step /1/.

11. A fuel tank equipment for aircraft, comprising a fuel tank and at least one capacitor fuel probe adapted for operation within a fuel tank of an aircraft, said capacitor fuel probe being fixed within said fuel tank, the capacitor fuel probe being configured for measuring a fuel level along a probe axis when a dielectric constant value of the fuel is comprised between a minimum limit $K_{min}$ and a maximum limit $K_{max}$, said minimum and maximum limits being prescribed for the capacitor fuel probe,
the capacitor fuel probe comprising a series of N separated capacitor segments which are superposed on one another along the probe axis, N being an integer higher than 5, each capacitor segment extending from a bottom height value to a top height value along the probe axis, and the top height value of any one of the capacitor segments corresponding to the bottom height value of the next capacitor segment when moving from the lowest one of the capacitor segments to the highest one of said capacitor segments,
the capacitor fuel probe being further designed so that any three successive ones of the capacitor segments are electrically isolated from each other, and each capacitor segment being assigned to one out of at least three sets by repeating one and same ordered sequence of the sets while moving from the lowest capacitor segment to the highest capacitor segment according to a superposition order along the probe axis, all the capacitor segments within each set being connected electrically according to a parallel connection arrangement separately from the other sets,
wherein, when all the capacitor segments are numbered progressively with an integer index n from the lowest capacitor segment to the highest capacitor segment along the probe axis, and $h_n$ denoting the top height value of the $n^{th}$ capacitor segment, the following condition is met:

$$h_{n-1} < h_n \cdot (K_{min}-1)/(K_{max}-1),$$

for any n-value from 2 to N,
so that measuring a first capacitor value corresponding to all the capacitor segments connected in parallel, indicates that at least one of the sets, called compensator set, has no capacitor segment crossed by the fuel level whatever the value of the fuel dielectric constant between the minimum limit $K_{min}$ and the maximum limit $K_{max}$, and so that a second capacitor value which is measured for said compensator set allows calculating an estimation of the fuel dielectric constant, and said estimation of the fuel dielectric constant in combination with the first capacitor value allows calculating a refined value for the fuel level.

* * * * *